(12) United States Patent
Huang

(10) Patent No.: US 11,661,983 B2
(45) Date of Patent: May 30, 2023

(54) BRAKE ADJUSTING DEVICE OF CABLE REEL

(71) Applicant: Kuei-Hsin Huang, Taipei (TW)

(72) Inventor: Kuei-Hsin Huang, Taipei (TW)

( * ) Notice: Subject to any disclaimer, the term of this patent is extended or adjusted under 35 U.S.C. 154(b) by 476 days.

(21) Appl. No.: 16/899,576

(22) Filed: Jun. 11, 2020

(65) Prior Publication Data

US 2021/0388875 A1    Dec. 16, 2021

(51) Int. Cl.
*F16D 55/22* (2006.01)
*B65H 75/30* (2006.01)

(52) U.S. Cl.
CPC ............. *F16D 55/22* (2013.01); *B65H 75/30* (2013.01)

(58) Field of Classification Search
CPC ............. F16D 2125/30; F16D 2125/36; F16D 2125/60; F16D 55/2262; F16D 63/004; F16D 2125/32; F16D 2125/66; F16D 55/36; F16D 2065/1384; F16D 55/22; B61H 5/00; B61H 13/22; B61H 15/0014; B61H 11/04; F16C 2361/45; B62L 1/00; B65H 75/30
See application file for complete search history.

(56) References Cited

U.S. PATENT DOCUMENTS

| 8,746,109 | B2* | 6/2014 | Tchernyi | B60T 7/108 |
| | | | | 74/523 |
| 10,364,125 | B2* | 7/2019 | Blair | B65H 75/4442 |
| 2014/0312159 | A1* | 10/2014 | Troitzsch | B65H 75/22 |
| | | | | 242/608.2 |
| 2016/0311642 | A1* | 10/2016 | Blair | B65H 75/4442 |
| 2019/0169850 | A1* | 6/2019 | Deutsch | E04D 13/0354 |

FOREIGN PATENT DOCUMENTS

WO    WO 2008022543 A1 *   2/2008

* cited by examiner

*Primary Examiner* — Robert A. Siconolfi
*Assistant Examiner* — Mahbubur Rashid
(74) *Attorney, Agent, or Firm* — Leong C. Lei

(57) ABSTRACT

A brake adjusting device is mountable to a frame and a rotary disc of a cable reel and includes a rotary knob mounted to an outside surface of the frame. A first pad is arranged between the frame and the rotary disc and is coupled to the rotary knob for synchronous rotation therewith and includes pushing parts in the form of slope. A second pad is arranged between the first pad and the rotary disc and is provided, on two opposite surfaces thereof, with first and second slope sections and friction plates. The rotary knob is operable to rotate the first pad for causing the pushing parts to press against first and second slope sections in order to move the second pad toward the rotary disc and causing the friction plates to get into tight engagement with the rotary disc to result in a braking effect.

5 Claims, 7 Drawing Sheets

BRAKE ADJUSTING DEVICE OF CABLE REEL

TECHNICAL FIELD OF THE INVENTION

The present invention relates to a brake adjusting device of a cable reel, and more particularly to one that is mountable to one or two of frames and rotary discs on two opposite sides of a cable reel, and includes a rotary knob that is arranged on an outer side surface of the frames and first and second pads that are set in contact engagement with each other and are located between the frames and the rotary discs, wherein the first pad is provided with a plurality of pushing parts that are made in a sloped configuration and are arranged at intervals and the second pad is provided, on a side surface thereof, with a plurality of first and second slope sections and is also provided, on an opposite side surface thereof, with a plurality of friction plates, and the first and second slope sections correspond to the pushing parts and the friction plates correspond to the rotary disc, so that the rotary knob is operable to drive the first pad to synchronously rotate therewith and the pushing parts of the first pad are caused to push and press the first and second slope sections of the second pad to thereby drive the second pad to move in a direction toward the rotary disc, causing the friction plates provided on the second pad to be in tight engagement with the rotary disc, thereby providing the rotary disc of the cable reel with a function of braking and stopping.

DESCRIPTION OF THE PRIOR ART

The progress of civilization and technology brings conspicuous advance of industrial with the times. Energy that is consumed by both the industrial and households is generally transmitted with electrical cables. Consequentially, constructions for power and wiring are generally carried out with the consumption of a large number of bundles of cables, and generally, the electrical cables are wound around reels for easy operation and transportation.

Cable reels that are currently available in the market are generally made in a round form, due primarily to low resistance and being easy of rotation for pulling and unwinding, and being particularly good for transportation and carrying, and being popular among the power construction workers. For the cable reels that are currently available in the market, when it needs to unwind a cable from a cable reel that is fully wound with electrical cable, an external force, which can be human labor or a machine, is applied to drag out the cable, causing the electrical cable to unwind and release from the bundle of cable wound on the reel. However, when the external force is removed and dragging of the cable is stopped, due to inertial of rotating, the cable may not be immediately stopped from unwinding, and consequentially, an extra length of the cable is unwound from the reel and the cable becomes over-unwound and gets slacking and even entangling. This often occurs and the construction workers have to first manage the cable before they can go on with the construction operation.

During an operation of unwinding a cable from a reel, when it needs to stop the operation midway, to prevent undesired slacking and releasing of the cable, a manual control is often applied to stop the reel. As the cable reel may be of a weight that is at least hundreds of kilograms or even tones, using human labor to brake or stop the reel is quite a risky operation to the reel operator, and may lead to human casualty. Thus, a major issue that the present invention is made to overcome is to provide a cable reel with a stopping or braking mechanism.

SUMMARY OF THE INVENTION

The present invention provides a brake adjusting device of a cable reel, which is mountable to a cable reel. The cable reel comprises two frames, and the frames comprise an axle stub. A rotary disc is movably fit to the axle stub, so that the rotary disc is rotatable about an axis defined by the axle stub. A central axle is arranged between the two rotary discs and connected thereto. The brake adjusting device is mounted to one of the frames and comprises a rotary knob, a first pad, and a second pad. The rotary knob is coupled to one side surface of the frame that is not coupled to the rotary disc and is rotatable about the axis defined by the axle stub. The first pad is arranged between the frame and the rotary disc. The first pad is in an annular form of a hollowed ring that is fit to the axle stub the axle stub and is coupled to the rotary knob, so that the rotary knob and the first pad have a mechanism of synchronous rotation therebetween. The first pad is provided, on a side surface thereof facing the rotary disc, with a plurality of pushing parts that are annularly arranged at intervals. The pushing parts are made in a raised form and descend from one end toward an opposite end to show a sloped configuration. Further, the first pad comprises spacing zones arranged between and alternate with the plurality of pushing parts. The spacing zones have a height that is smaller than a height of the pushing parts. The second pad is arranged between the first pad and the rotary disc. The second pad is in an annular form of a hollowed ring that is fit to the axle stub. The second pad and the axle stub forms rotating interference therebetween, so as to achieve a mechanism that the second pad is not rotatable, but is linearly movable, relative to the axle stub. Further, the second pad is provided, one a side surface thereof, facing the first pad, with a plurality of first slope sections and a plurality of second slope sections that annularly arranged in sequence. The first slope sections and the second slope sections are connected to each other. The second slope sections have a height greater than a height of the first slope sections. Further, the second pad is provided, on a side surface thereof facing the rotary disc, with a plurality of friction plates that are annularly arranged at intervals. The pushing parts of the first pad are corresponding to and opposite to the first slope sections of the second pad and the spacing zones of the first pad are corresponding to and opposite to the second slope sections of the second pad, so that the first pad and the second pad are set in tight engagement with each other.

Alternatively, two such brake adjusting devices may be provided for respectively mounted to the two frames.

The technical features of the present invention reside in that the first pad is provided with a plurality of pushing parts that are arranged at intervals and have a sloped configuration and the second pad is provided on one surface thereof with a plurality of first slope sections and a plurality of second slope sections and is also provided on an opposite surface thereof with a plurality of friction plates, wherein the pushing parts of the first pad correspond to the first slope sections and the second slope sections of the second pad and the friction plates of the second pad correspond to the rotary disc, such that when the rotary knob is rotated, the first pad is driven to synchronously rotate therewith and under such a condition, during the rotation of the first pad, the pushing parts of the first pad sequentially presses the first slope sections (which are portions at a relatively lower position)

and the second slope sections (which are portions at a relatively higher position) of the second pad, and the second pad is pushed, step by step, to move in a direction toward the rotary disc, causing the plurality of friction plates provided on the second pad to tightly engage and contact with the rotary disc, thereby providing the rotary disc of a cable reel with a mechanism of stopping (braking) and thus, an operator directly applying a force to brake or stop the cable reel that leads to high risks can be avoided.

DETAILED DESCRIPTION OF THE PREFERRED EMBODIMENT

Figure 1:
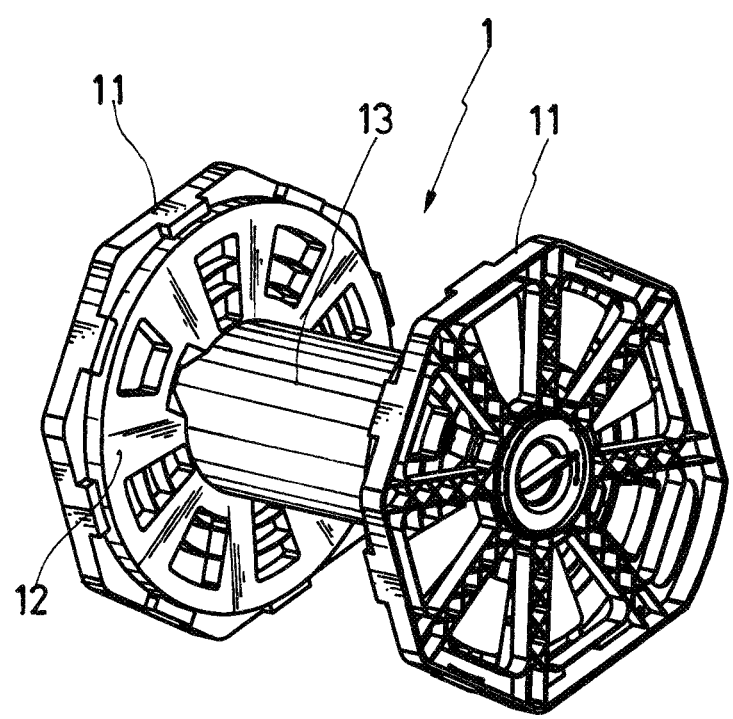
FIG. 1 is a perspective view showing a brake adjusting device of a cable reel according to the present invention.
Figure 2:
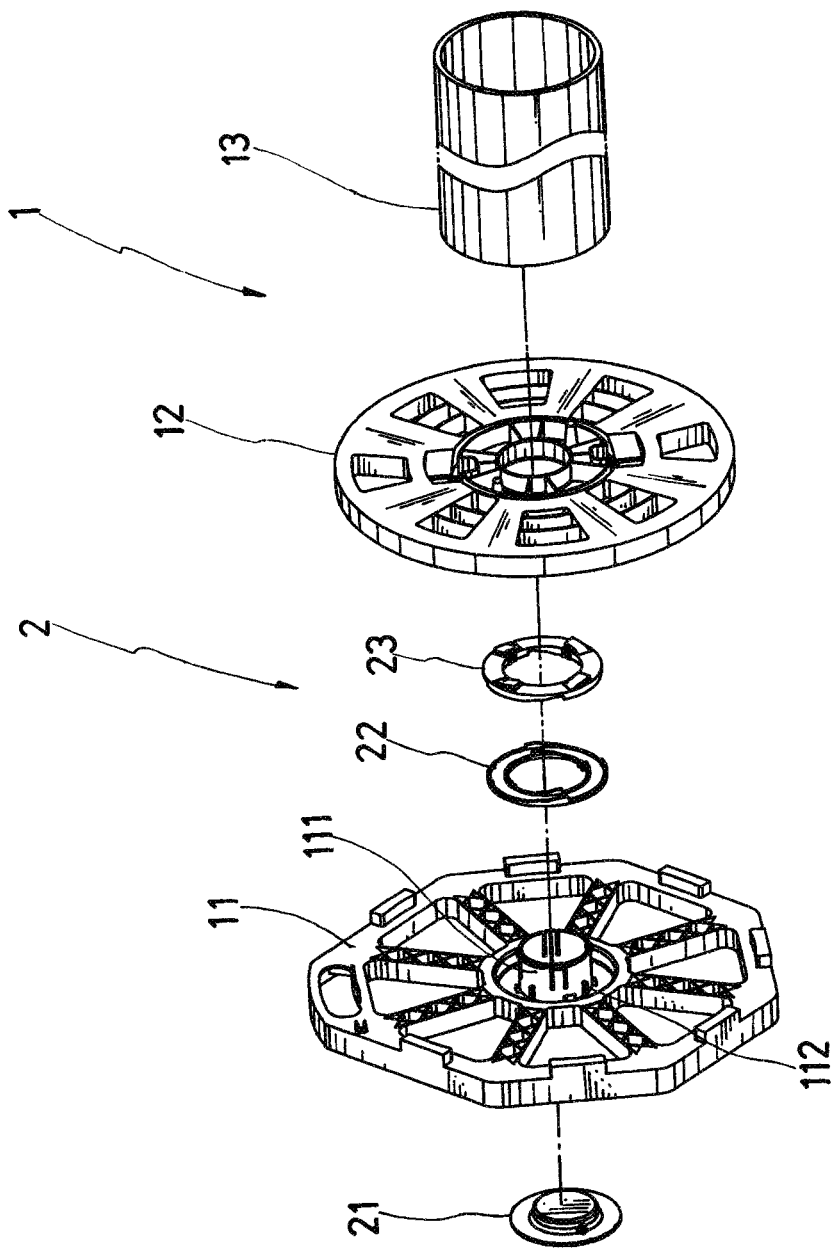
FIG. 2 is an exploded view showing one side portion of the brake adjusting device of the cable reel according to the present invention.

Referring to FIGS. 1-9, the present invention provides a cable reel brake adjusting device, and in particularly one that is mounted in and used with a cable reel 1. The cable reel 1 may include two frames 11, and the frames 11 include an axle stub 111. The axle stub 111 receives, in a movable manner, a rotary disc 12 fit thereto, so that the rotary disc 12 is rotatable about an axis defined by the axle stub 111. Further, mutually coupled between the two rotary discs 12 is a central axle 13 that is connected thereto to form the cable reel 1 (as shown in FIGS. 1 and 2).

The above-mentioned brake adjusting device 2 is mountable to the frame 11 of one side of the cable reel 1 or two such brake adjusting devices 2 are respectively mounted to the frames 11 on the two sides of the cable reel 1. In an illustrative example of the present invention, one single brake adjusting device 2 is provided and mounted to the frame 11 of one of the two sides of the cable reel 1, and the brake adjusting device 2 comprises a rotary knob 21, a first pad 22, and a second pad 23.

Figure 6:
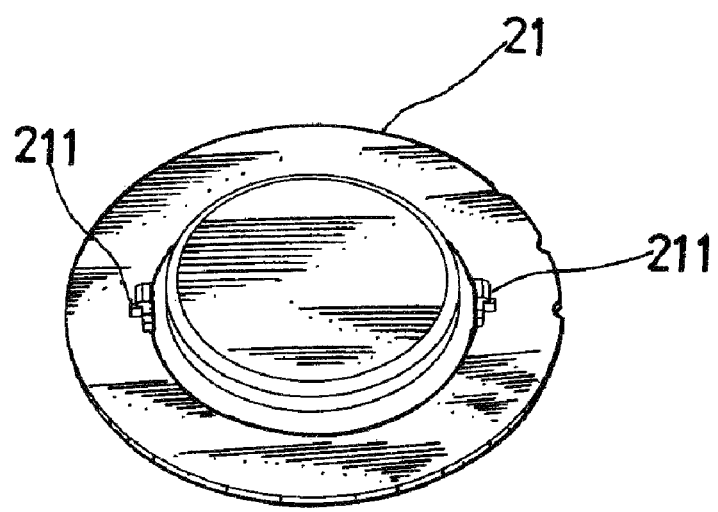
FIG. 6 is a perspective view showing a rotary knob of the brake adjusting device of the cable reel according to the present invention.
Figure 7:
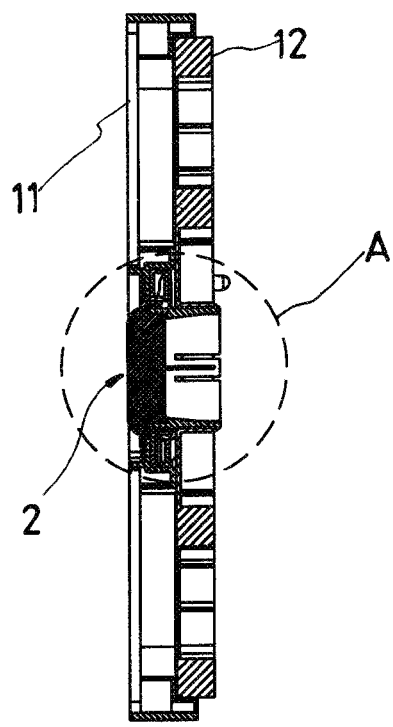
FIG. 7 is a cross-sectional view showing a part of the brake adjusting device of the cable reel according to the present invention in an assembled form.
Figure 8:
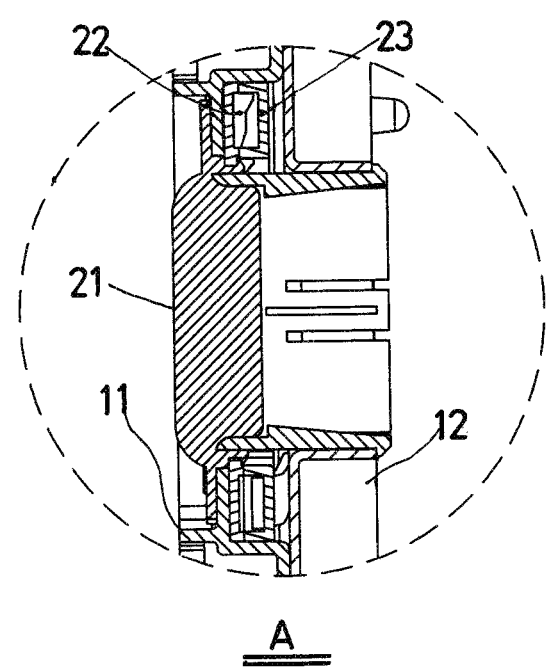
FIG. 8 is an enlarged view of a circled part of FIG. 7.
Figure 9:
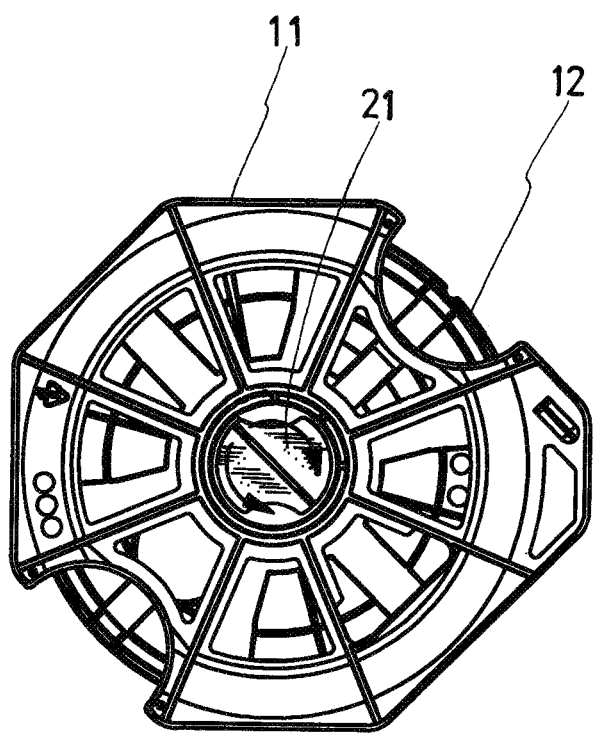
FIG. 9 is a side elevational view showing the brake adjusting device of the cable reel according to the present invention.

The rotary knob 21 (as shown in FIG. 6) is coupled to one side surface of the frame 11 that is not coupled to the rotary disc 12, and the rotary disc 12 is rotatable about the axis defined by the axle stub 111. Further, the rotary knob 21 is provided, on a side surface thereof that faces the axle stub 111, with at least one second projecting block 211.

Figure 3:
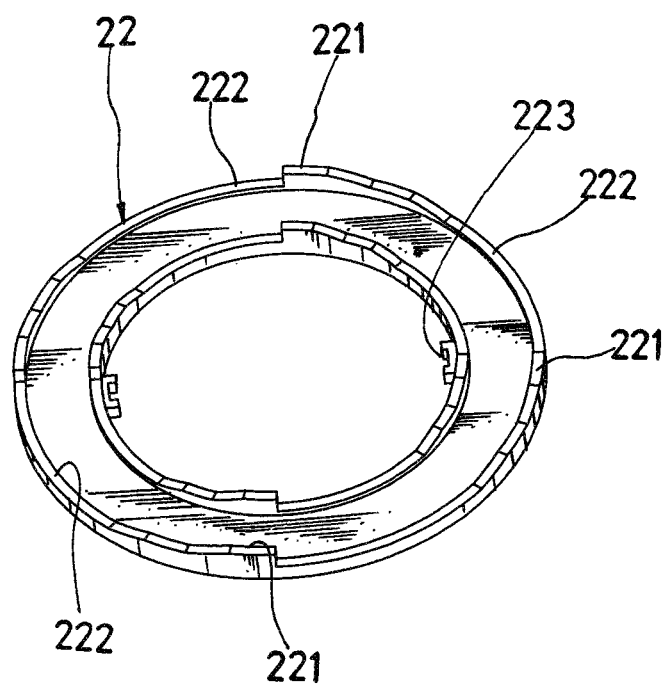
FIG. 3 is a perspective view showing a first pad of the brake adjusting device of the cable reel according to the present invention.

The first pad 22 (as shown in FIG. 3) is arranged between the frame 11 and the rotary disc 12. The first pad 22 is in an annular form of a hollowed ring that is fit to the axle stub 111 of the frame 11, and the first pad 22 and the rotary knob 21 are coupled to each other. The first pad 22 has an annular surface of the hollowed ring that is provided with at least one first limiting trough 223. The first limiting trough 223 is engageable with and mates the second projecting block 211 of the rotary knob 21, providing a mechanism for synchronous rotation between the rotary knob 21 and the first pad 22. Further, the first pad 22 is provided, on a side surface thereof facing the rotary disc 12, with a plurality of pushing parts 221 that are annularly arranged at intervals and spaced from each other circumferentially. The pushing parts 221 are made in a raised form and descends continuously from one end toward an opposite end, preferably in a step by step manner, to show a sloped configuration. The first pad 22 comprises spacing zones 222 arranged between and alternate with the plurality of pushing parts 221, and the spacing zones 222 have a height that is smaller than heights of the pushing parts 221.

Figure 4:
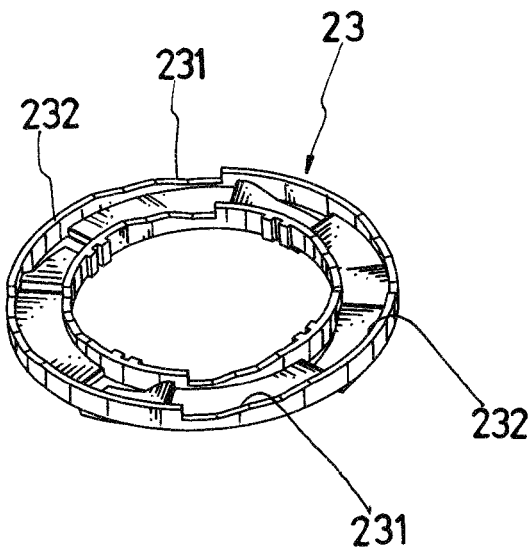
FIG. 4 is a perspective view, taken from a rear side, showing a second pad of the brake adjusting device of the cable reel according to the present invention.
Figure 5:
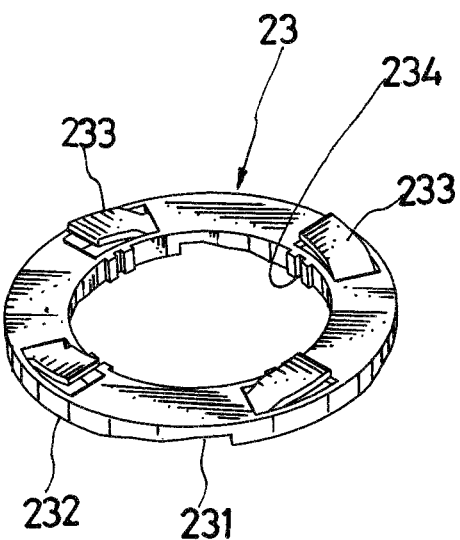
FIG. 5 is a perspective view, taken from a front side, showing the second pad of the brake adjusting device of the cable reel according to the present invention.

The second pad 23 (as shown in FIGS. 4 and 5) is arranged between the first pad 22 and the rotary disc 12. The second pad 23 is in an annular form of a hollowed ring that is fit to the axle stub 111 of the frame 11, and the second pad 23 has an annular surface of the hollowed ring that is provided with at least one second limiting trough 234. The second limiting trough 234 is engageable with and mates at least one first projecting block 112 of the axle stub 111, providing rotating interference fitting between the second pad 23 and the axle stub 111, so as to achieve a mechanism that the second pad 23 is not rotatable, but is linearly movable, relative to the axle stub 111. Further, the second pad 23 is provided, one a side surface thereof, facing the first pad 22, with a plurality of first slope sections 231 and a plurality of second slope sections 232 that annularly arranged in sequence, and the first slope sections 231 and the second slope sections 232 are connected to each other circumferentially. The second slope sections 232 have a height that is greater than a height of the first slope sections 231. Further, the second pad 23 is provided, on a side surface thereof facing the rotary disc 12, with a plurality of friction plates 233 that are annularly arranged at intervals and spaced from each other circumferentially. The friction plates 233 are raised from the side surface of the second pad 23, and the friction plates 233 and the second pad 23 are integrally combined together as a unitary structure, or alternatively, the friction plates 233 are each an individual element that is attached, in a fixed manner, to and thus combined with the second pad 23.

The pushing parts 221 (which are parts having a relatively greater height) of the first pad 22 and the first slope sections 231 (which are portions having a relatively smaller height) of the second pad 23 are arranged to respectively correspond to and are opposite to each other; and the spacing zones 222 (which are parts having a relatively smaller height) of the first pad 22 and the second slope sections 232 (which are portions having a relatively greater height) of the second pad 23 respectively correspond to and are opposite to each other, so as to allow the first pad 22 and the second pad 23 to be set in tight engagement with each other and are relatively positioned between the frame 11 and the rotary disc 12.

The rotary discs 12 on the two sides of the cable reel 1 and the central axle 13 are rotatable through a cable being withdrawn out of the reel. To stop the rotation of the rotary discs 12 resulting from inertia, a user may rotate the rotary knob 21 (such as in a clockwise direction or in a counterclockwise direction) that is located on an outer side of the frame 11, so that the rotary knob 21 drives the first pad 22 to synchronously rotate in unison therewith. Under such a condition, through the rotation of the first pad 22, the pushing parts 221 of the first pad 22 may push and press down the first slope sections 231 (which are portions at a relatively lower position) and the second slope sections 232 (which are portions at a relatively higher position) of the second pad 23 to push, step by step, the second pad 23 to move in a direction toward the rotary disc 12, causing the plurality of friction plates 233 provided on the second pad 23 to tightly engage and contact with the rotary disc 12 to achieve a mechanism of stopping (braking) for the rotary disc 12 of the cable reel 1. In this way, an operator directly applying a force to brake or stop the rotation of the cable reel 1 is avoided.

Thus, the technical features of the present invention reside in that the first pad 22 is provided with a plurality of pushing parts 221 that are arranged at intervals and have a sloped configuration and the second pad 23 is provided on one surface thereof with a plurality of first slope sections 231 and a plurality of second slope sections 232 and is also provided on an opposite surface thereof with a plurality of friction plates 233; and by means of, during the rotation of the first pad 22, the pushing parts 221 of the first pad 22 sequentially pushing and pressing the first slope sections 231 (which are portions at a relatively lower position) and the second slope sections 232 (which are portions at a relatively higher position) of the second pad 23, the second pad 23 is pushed, step by step, to move in a direction toward the rotary disc 12, causing the plurality of friction plates 233 provided on the second pad 23 to tightly engage and contact with the rotary disc 12 to thereby provide the rotary disc 12 of the cable reel 1 with an excellent mechanism of stopping (braking) and adjusting or regulating.

I claim:

1. A brake adjusting device of a cable reel, the cable reel comprising two frames, each of the two frames comprising an axle stub, a rotary disc two rotary discs each being movably fit to the axle stub, so that the rotary disc is discs are rotatable about an axis defined by the axle stub, a central axle being arranged between the two rotary discs and connected thereto, the brake adjusting device being mounted to one of the frames and comprising:

a rotary knob, which is coupled to one side surface of the one of the frames that is not coupled to the rotary disc and is rotatable about the axis defined by the axle stub;

a first pad, which is arranged between the one of the frames and the rotary disc, the first pad being in an annular form of a hollowed ring that is fit to the axle stub, the first pad and the rotary knob being coupled to each other, so that the rotary knob and the first pad have a mechanism of synchronous rotation therebetween, the first pad being provided, on a side surface thereof facing the rotary disc, with a plurality of pushing parts that are annularly arranged at intervals, the pushing parts being made in a raised form and descending from one end toward an opposite end to show a sloped configuration, the first pad comprising spacing zones arranged between and alternate with the pushing parts, the spacing zones having a height that is smaller than a height of the pushing parts; and a second pad, which is arranged between the first pad and the rotary disc, the second pad being in an annular form of a hollowed ring that is fit to the axle stub, the second pad and the axle stub forming rotating interference therebetween, so as to achieve a mechanism that the second pad is not rotatable, but is linearly movable, relative to the axle stub, the second pad being provided, one a side surface thereof, facing the first pad, with a plurality of first slope sections and a plurality of second slope sections that annularly arranged in sequence, the first slope sections and the second slope sections being connected to each other, the second slope sections having a height greater than a height of the first slope sections, the second pad being provided, on a side surface thereof facing the rotary disc, with a plurality of friction plates that are annularly arranged at intervals;

wherein the pushing parts of the first pad and the first slope sections of the second pad are arranged to correspond to each other and the spacing zones of the first pad and the second slope sections of the second pad correspond to each other, so that the first pad and the second pad are set in tight engagement with each other, and wherein when the rotary knob drives the first pad to synchronously rotate therewith, the pushing parts of the first pad press and push the first slope sections and the second slope sections of the second pad to drive the second pad to move in a direction toward the rotary disc, causing tight engagement between the friction plates of the second pad and the rotary disc.

2. The brake adjusting device of the cable reel according to claim 1, wherein each of the two frames comprises at least one first projecting block provided on the axle stub, the second pad having an annular surface that is provided with at least one second limiting trough, the first projecting block and the second limiting trough being engageable with and mating each other to form the rotating interference between the second pad and the axle stub, which achieves the mechanism that the second pad is not rotatable, but is linearly movable, relative to the axle stub.

3. The brake adjusting device of the cable reel according to claim 1, wherein the rotary knob is provided, on a side surface thereof that faces the axle stub, with at least one second projecting block, the first pad having an annular surface that is provided with at least one first limiting trough, the second projecting block and the first limiting trough being engageable with and mating each other, so as to achieve the mechanism of synchronous rotation between the rotary knob and the first pad.

4. The brake adjusting device of the cable reel according to claim 1, wherein the friction plates and the second pad are integrally formed with each other.

5. The brake adjusting device of the cable reel according to claim 1, wherein each of the friction plates is an individual element that is attached, in a fixed manner, to and combined with the second pad.

* * * * *